Figure 4:
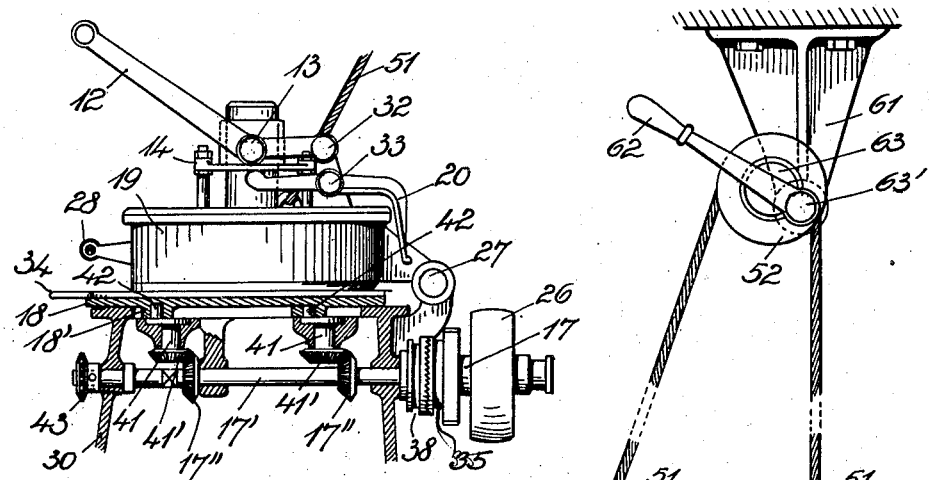

May 19, 1931.    G. RAUSCH    1,805,705
DOUGH DIVIDING AND WORKING MACHINE
Filed Feb. 11, 1927    2 Sheets-Sheet 1
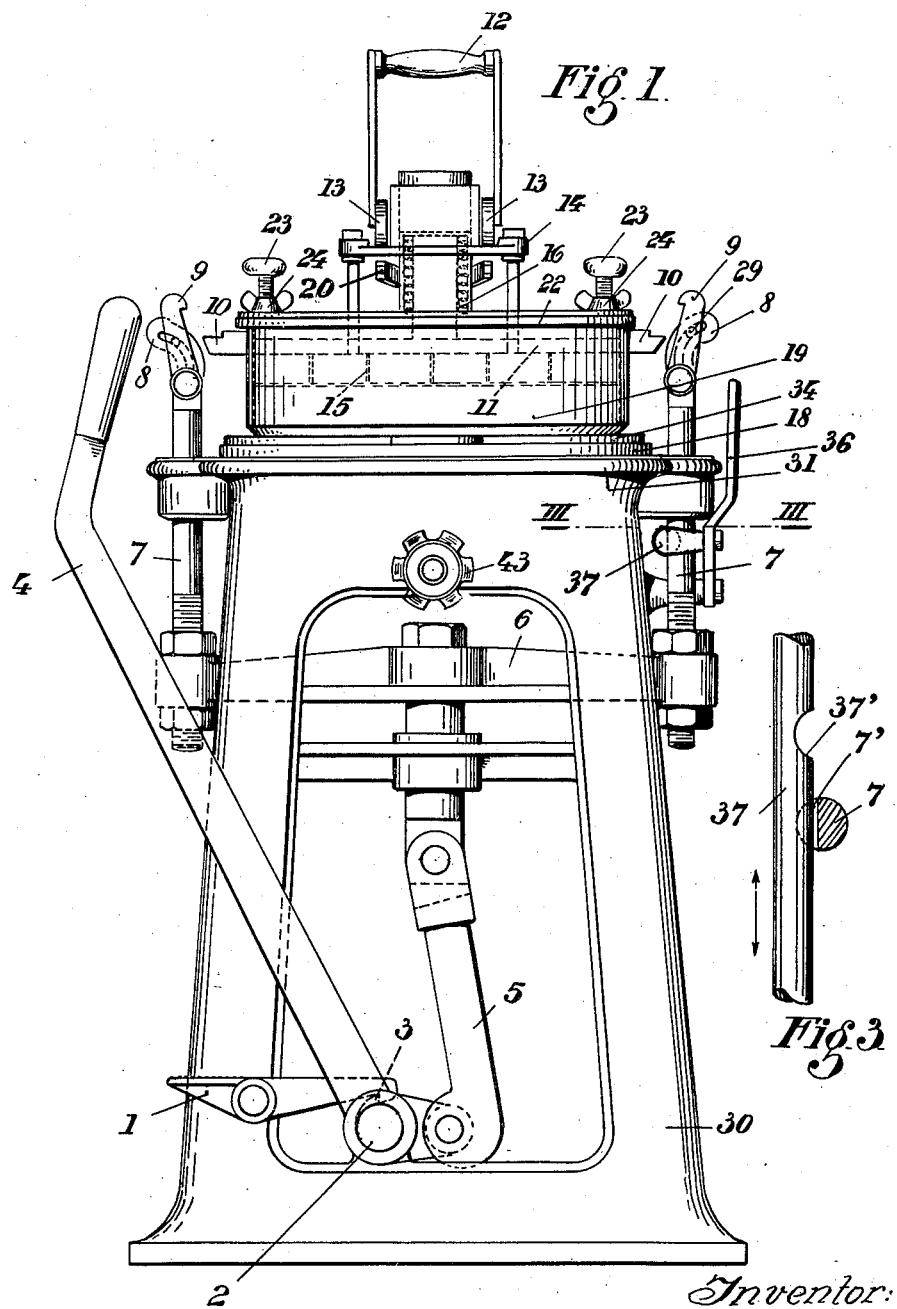
Inventor:
Gottfried Rausch
by [signature]
Atty.

May 19, 1931.  G. RAUSCH  1,805,705

DOUGH DIVIDING AND WORKING MACHINE

Filed Feb. 11, 1927   2 Sheets-Sheet 2

Inventor:
Gottfried Rausch
by Kruishank
Atty.

Patented May 19, 1931

1,805,705

UNITED STATES PATENT OFFICE

GOTTFRIED RAUSCH, OF AMMENDORF, NEAR HALLE-ON-THE-SAALE, GERMANY

DOUGH DIVIDING AND WORKING MACHINE

Application filed February 11, 1927, Serial No. 167,500, and in Germany September 24, 1926.

My invention relates to dough dividing and working machines of the type in which a presser head supporting the parts for pressing, dividing and working the dough is pivotally supported on the frame of the machine above a table. It is an object of my invention to provide a machine of this kind in which pressure is exerted on the dough not by the usual rotary dough-supporting plate but by the press plate in the presser head.

To this end I provide mechanism for exerting pressure on the press plate which is supported in the frame of the machine, and I provide automatic means for disconnecting the mechanism and the press plate in certain positions of the mechanism so that on the one hand the considerable pressure required for compressing the dough is exerted on the press plate at full force and, on the other hand, the pivotal motion of the presser head is not interfered with by the press-plate operating mechanism.

Pivotal presser heads are preferable to vertically displaceable ones as the parts of the head which act on the dough, and particularly the press plate and the dividing knives, which together constitute the working cells, are more readily accessible for inspection and cleaning. It has already been proposed to obtain a particularly simple design in machines of this kind by combining a rotary dough-supporting plate with a stationary presser head. On the other hand it is not desirable and would complicate this simple design to impart vertical motion to the rotary dough-supporting plate in order to compress the dough, but it is preferable to provide a press plate in the pivotal presser head for compressing the dough. On the other hand this involves the difficulty that the mechanism for exerting pressure by hand on the press plate cannot be arranged in or on the pivotal presser head, for firstly the presser head does not provide space for such a mechanism and secondly it is very heavy as compared with the usual pivotal lids of dividing machines, as in a dividing and working machine the pivotal presser head supports all the parts required for dividing and working the dough, and consequently additional weight in this heavy part is most undesirable.

These drawbacks are overcome and I am at the same time enabled to provide a press-plate operating mechanism which is able to exert the high pressure required, notwithstanding its being operated by hand, by arranging the mechanism in the frame of the machine. When the presser head is in position on the dough-supporting plate, the press plate is engaged by the mechanism in the frame of the machine and is forced down on the dough at the required leverage notwithstanding the fact that it partakes in the pivotal motion of the presser head.

The frame of the machine affords sufficient space for the mechanism.

The mechanism is provided with a long handle of the usual type and the motion of this handle is transmitted to the press plate by an automatic connection which prevents interfering of the mechanism with the pivotal motion of the presser head which is required for removing the finished balls of dough and for inserting a fresh lump. Preferably the connection is so designed as to automatically engage and depress the press plate, when the presser head has been lowered onto the dough-supporting plate and the handle of the mechanism is operated, and to automatically release the press plate, when the handle is returned to its initial position. Preferably automatic means such as a spring are provided for returning the press plate into its initial position as well when the handle has been returned, so that the press plate can be relied on to be lifted from the compressed lump before the working operation is started.

It is another object of my invention to facilitate the handling of the comparatively heavy presser head. The head must be handled during the operations of pressing, dividing and working the dough many times per day and therefore the expenditure of power required for handling the presser head is considerable. According to my invention the operator is relieved by providing balance weights or other means for entirely or partly balancing the weight of the presser head. With these and other objects not specifically mentioned in view, the invention consists in certain constructions and combinations which will be hereinafter fully described and then specifically set forth in the claims hereunto appended.

In the drawings affixed to this specification and forming part thereof a machine provided with the new presser-plate operating mechanism is illustrated diagrammatically by way of example.

Figure 2:
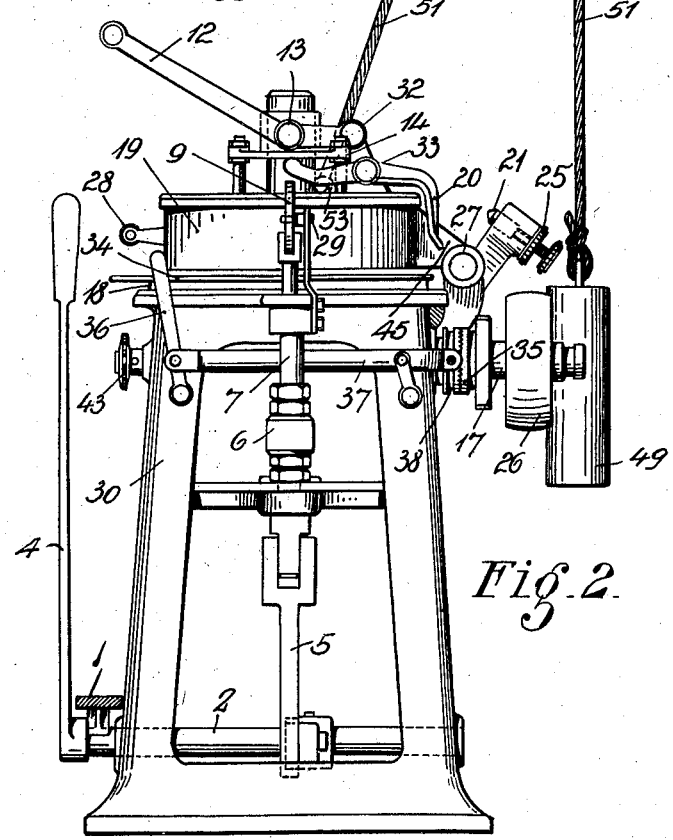

In the accompanying drawings which form a part of this specification and in which like characters of reference indicate the same or like parts, Fig. 1 is a front elevation, Fig. 2 is an end elevation of a dough-dividing and working machine having a rotary dough-supporting plate, Fig. 3 is a section on the line III—III in Fig. 1, drawn to a larger scale, showing means for interlocking the press-plate mechanism and the drive of the machine, Fig. 4 is an elevation of the upper end of the machine partly in section on the axis of its main driving shaft to show the gearing by which rotary motion is imparted to the dough-supporting plate.

Referring first to Figs. 1 to 3, 18 is a rotary dough-supporting plate which is carried on a table 31 at the top of the frame 30. Rotary motion is imparted to the plate 18 from a shaft 17 equipped with a pulley 26 and a clutch 35, 38 through the medium of bevel gears 17″ on a shaft extension 17′ which are meshing with bevel gears 41′ on short shafts 41 carried in bearings of the frame 30 below the plate 18. Crank pins 42 are secured on each shaft 41 engaging bosses 18′ on the lower face of the plate 18.

The presser head 19 is pivotally carried on the frame of the machine at 27 by means of a lug 45 and is provided with a handle 28. 11 is the press plate which is adapted to be displaced axially in the presser head 19 against the action of a spring 16 tending to return the press plate into its upper final position in which it engages two pins 23 which are threaded at their upper ends and provided with handles and winged lock nuts 24, which abut on the top plate 22 of the presser head. 10 are projections extending from the presser plate 11 to the outside of the presser head at diametrically opposite sides.

In order that the pressing action of the plate 11 may be effected with sufficient force by hand so as to properly compress the dough, a mechanism comprising a cross head 6 is arranged in the machine frame 30, the mechanism being only temporarily operative during pressing movement of the press plate 11, and incapable of preventing the motion of the presser head about the pivot 27. A shaft 2 is supported at a lower part of the machine frame 30 which shaft carries the press or hand lever 4 maintained in its inoperative position by the pawl of a foot lever 1, which falls over a projection 3 on the press or hand lever 4. The short arm of the press lever is connected by means of a thrust rod 5 with a cross head 6 vertically guided by the machine frame 30, which cross head 6 carries two lateral pulling rods 7 likewise guided by the frame 30. At the upper ends of the rods 7 are disposed pivoted grippers 9 whose laterally projecting pins 29 slide in curved slots 8 provided in brackets or plates secured to the table 31 of the machine frame 30.

In the presser head 19 and movable with respect to this as well as to the press plate are disposed dividing knives 15 which form in the usual manner star-shaped cells of equal capacity. These knives are carried by a holder 14 in the presser head 19, levers 12 and 20 being disposed to bear against its upper and lower sides but without having any rigid connection with the said holder 14. The lever 12 is fork-shaped and pivotally supported at 32 on the presser head and presses on the knife holder 14 by means of rollers 13, and the double lever 20 pivotally supported as at 33 on the presser head 19 and below the holder 14 bears against the lower side of the said knife holder 14. A stop 21 mounted on the machine frame operates the lever 20 when the presser head is swung back about the pivot 27, the said stop 21 being adjustable by means of a screw 25 secured by a counter-nut.

The rotary working motion of the plate 18 carrying the removable dough-plate 34 only must occur temporarily namely at the end of pressing and dividing of the dough-lump. Consequently the drive for the rotary motion of the plate 18 must be engageable with and disengageable from the driving shaft 17 which is itself constantly in rotation. The actuation of this coupling 35 of the clutch can for example be effected in the following way.

At the front end of the machine frame 30 a hand coupling lever 36 is pivotally supported which by means of a rod 37 displaces the axially movable coupling part 38 of the clutch. The coupling 35, 38 must only be engaged after the pressing process is completed so that pressing and division is only possible when the dough carrying plate 18 is stationary and to this end the rod 37 is adapted to interlock with the adjacent rod 7 of the cross head 6. Each rod has a semi-circular recess 7' and 37' as will appear from Fig. 3 and it will be understood that in this manner a provision is made for only one of the rods moving at a time except when the cut-out portions register.

Obviously, the presser head 19 and its associated parts are rather heavy, and, to facilitate the handling of the head it is preferably balanced by a weight or by similar expedients. As illustrated in Fig. 2, a balance weight 49 is connected with the presser head 19 by means of a rope 51 on a pulley 52.

The operation of the machine is as follows. In the position of rest the presser head is in its raised position so that the dividing knives 15 are forced by the cooperation of the free arm of the lever 20 with the stop 21 into their uppermost position in which their lower edge lies in the same plane as the lower face of the press plate 11 which is drawn by its spring 16 against the positioning screws 23. The press lever 4 remains in the position illustrated and is maintained there by the foot lever 1. The plate 34 which carries the lump of dough to be treated is now placed on the plate 18 which can be adjusted by means of the front hand wheel 43 into the correct, that is to say, the central position and then the presser head 19 is drawn down by means of the hand grip 28. By stepping on the foot lever 1 the press lever 4 is released and is then swung by hand to the right, Fig. 1. The rods 7 are thereby moved downwardly by means of the cross head 6 whereby the grippers 9 in consequence of the guiding motion of the pins 29 in the curved slots 8 simultaneously move downwardly and inwardly against the presser head in such manner that their grippers 9 engage the arms 10 of the press plate projecting out of the presser head which then draw this plate downwardly. The consequence is that the irregular lump of dough is flattened out into a wide flat circular sheet or layer.

If the cutting lever 12 be now moved down by means of its hand grip the dividing knives 15 cut out the dough pieces. The press lever 4 is now swung back to the left, Fig. 1, into its initial position so that the pedal 1 falls over the projection 3 and locks the lever 4 in position. By this movement of the lever 4 the grippers move upwardly and outwardly so that they release the arms 10 of the press plate 11, and the press plate is then raised into its original position by the spring 16. A hollow space is thus created above the divided dough pieces lying in the knife cells which, on the following working operation, allows the balls of dough to expand upwardly. This lifting of the press plate before the beginning of the working ensures the non-adherence of the divided dough pieces during the working to the underside of the press plate 11 which would interfere with the desired globular formation of the dough.

To start working the coupling lever 36 is swung rearwardly. The displacement of the coupling rod 37 is possible in the rest position of the press-plate mechanism 4, 5, 6, 7, because the rod 7 crossing the coupling rod 37 is cut out semi-cylindrically at 7' to allow the rod 37 to move. After the plate 18 with the dough plate 34 has effected a certain number of rotary motions the coupling 35, 38 is again disengaged by means of the lever 36 so that the rods 37 come into that position in which the cut-out portion 37' again renders possible the actuation of the press-plate mechanism 4, 5, 6, 7.

At the end of working the presser head 19 is swung upwards about the hinge 27 by means of the hand grip 28. The dividing knives 15 are in their highest position and are completely withdrawn from the press plate 11 which now is in its uppermost position. The working cells are then fully accessible which is of particular advantage for the purpose of efficiently cleaning the machine parts from the dough to be treated. The knife holder 14 and the dividing knives 15 are withdrawn upwards into the press plate 11 only at the end of the hinge-movement by the cooperation of the free arms of the double lever 20 with the stop 21. The machine is now in its starting position.

It may be of considerable advantage during the working of the machine for the treatment of the dough to alter the balancing action of the counterweight 49 or to eliminate it. For this purpose the rope 51 is carried by the pulley 52—which is annular—on an eccentric 63. The pivot 63' of the eccentric is supported in a bracket 61. By means of a hand lever 62 or the like the eccentric disc may be swung and therewith the pulleys 52 at any suitable time before or during the working of the machine so that the leverage of the balance weight may be varied. The application of the balance weight is not limited to the body of the presser head 19 but the weight or weights may be attached to any one of its parts, for instance, the press plate 11. The variation of the leverage of the weight 49 can be effected by hand or mechanically, for example at different times of the working process. For this purpose the pivot 63' of the eccentric disc 63 need only be connected by a gear wheel drive of any suitable type with the main shaft 17 of the machine and the mechanical operation may be placed under the control of any suitable mechanism.

I wish it to be understood that I do not desire to be limited to the exact details of construction shown and described for obvious modifications will occur to a person skilled in the art.

I claim:—

1. A dough-dividing machine comprising a frame, a presser head pivoted to said frame, a press plate mounted in said presser head for operating movement relative thereto, mechanism carried on the frame of said machine for operating said press plate, and automatic means connected with said press-plate operating mechanism for interrupting its operative connection with said press plate in a given relative position of said mechanism and said press plate.

2. A dough-dividing machine comprising a frame, a pressed head pivoted to said frame, a press plate mounted in said pressed head for operating movement relative thereto, a hand lever pivotally carried on the frame of said machine, mechanism adapted to be displaced on said frame and operatively connected with said hand lever and said press plate, and automatic means for interrupting the operative connection of said mechanism with said press plate in a given relative position of said mechanism and said frame.

3. A dough-dividing machine comprising a frame, a presser head pivoted to said frame, a press plate in said presser head, a hand lever pivotally carried on the frame of said machine, a cross head operatively connected with said hand lever and adapted to be displaced vertically in said frame, a gripper linked to said cross head and adapted to engage said press plate, and a cam on said frame adapted to regulate the position of said gripper with respect to said press plate in conformity with the reciprocating motion of said cross head.

4. A dough-dividing and working machine comprising a frame, a presser head pivoted to said frame, a press plate in said presser head, mechanism carried on the frame of said machine for operating said press plate, automatic means connected with said press plate operating mechanism for interrupting its operative connection with said press plate in a given relative position of said mechanism and said press plate, means for working the dough including a clutch element, means for throwing in and out said element, and automatic means for interlocking said element controlling means and said press plate operating mechanism.

5. A dough-dividing and working machine comprising a frame, a presser head pivoted to said frame, a press plate in said presser head, a hand lever pivotally carried on the frame of said machine, a cross head operatively connected with said hand lever and adapted to be displaced vertically in said frame, a rod secured to said cross head, automatic means for connecting said rod with, and disconnecting it from, said press plate, operatively connected with said rod, means for working the dough including a clutch element, a push rod for throwing in and out said element, and means for interlocking said push rod and said rod on said cross head.

6. A dough-dividing machine comprising a frame, a presser head pivoted to said frame, a press plate in said presser head, mechanism carried on the frame of said machine for operating said press plate, automatic means connected with said press-plate operating mechanism for interrupting its operative connection with said press plate in a given relative position of said mechanism and said press plate, and automatic means for returning said press plate to its initial position.

7. A dough-dividing machine comprising a frame, a presser head pivoted to said frame, a press plate in said presser head, mechanism carried on the frame of said machine for operating said press plate, automatic means connected with said press-plate operating mechanism for interrupting its operative connection with said press plate in a given relative position of said mechanism and said press plate, automatic means for returning said press plate to its initial position, and adjustable abutments in said presser head for limiting the return stroke of said press plate.

8. A dough-dividing and working machine comprising a frame, a presser head pivoted to said frame, a press plate in said presser head, mechanism carried on the frame of said machine for operating said press plate, means for working the dough including a clutch element, means for throwing in and out said element, and automatic means for interlocking said element controlling means and said press plate operating mechanism.

9. A dough-dividing machine comprising a frame, a presser head pivoted to said frame, a press plate in said presser head, dividing knives arranged in said presser head, hand operated means for forcing down said knives into the dough, automatic means for withdrawing said knives when the presser head is lifted from said frame, mechanism carried on the frame of said machine for operating said press plate, and automatic means connected with said press-plate operating mechanism for interrupting its operative connection with said press plate in a given relative position of said mechanism and said press plate.

10. A dough-dividing machine comprising a frame, a presser head pivoted to said frame, a press plate in said presser head, dividing knives arranged in said presser head, hand operated means for forcing down said knives into the dough, a stop on said frame, a lever fulcrumed on said presser head, operatively connected with said knives so as to withdraw said knives and adapted to be engaged by said stop, mechanism carried on the frame of said machine for operating said press plate, and automatic means connected with said press plate operating mechanism for interrupting its operative connection with said press plate in a given relative position of said mechanism and said press plate.

11. A dough-dividing machine comprising a frame, a presser head pivoted to said frame, a press plate in said presser head, dividing knives arranged in said presser head, hand operated means for forcing down said knives into the dough, an adjustable stop on said frame, a lever fulcrumed on said presser head, operatively connected with said knives so as to withdraw said knives and adapted to be engaged by said stop, mechanism carried on the frame of said machine for operating said press plate, and automatic means connected with said press-plate operating mechanism for interrupting its operative connection with said press plate in a given relative position of said mechanism and said press plate.

12. A dough dividing and working machine comprising in combination, a dough supporting surface, a head pivoted above said surface, a press plate movable in said head, dividing knives movable in said head relative to said press plate, means for forcing said press plate towards said support, means independent of said press plate operating means for moving said knives toward said support said head being constructed and arranged to enclose said press plate to enclose the dough during working thereof, and mechanism for gyrating said supporting surface.

13. A dough dividing and working machine comprising in combination, a dough supporting surface, a head pivoted above said surface, a press plate movable in said head, dividing knives movable in said head relative to said press plate, means for forcing said press plate towards said support, means for moving said knives toward said support, mechanism for gyrating said supporting surface, mechanism for causing said press plate operating means to release the plate in one position of said means and devices for automatically returning said plate when released to a position away from said support.

14. A dough dividing and working machine comprising in combination, a dough supporting surface, a head pivoted above said surface, a press plate movable in said head, dividing knives movable in said head relative to said press plate, means for forcing said press plate towards said support, means for moving said knives toward said support, mechanism for gyrating said supporting surface, and a machine frame on which the head is pivoted, said press plate operating means being carried by said frame.

15. A dough dividing and working machine comprising in combination, a dough supporting surface, a head pivoted above said surface, a press plate movable in said head, dividing knives movable in said head relative to said press plate, means for forcing said press plate towards said support, means for moving said knives toward said support, mechanism for gyrating said supporting surface, and devices for preventing operation of said gyrating mechanism while the press plate is being operated.

16. A dough dividing and working machine comprising in combination, a dough supporting surface, a head pivoted above said surface, a press plate movable in said head, dividing knives movable in said head relative to said press plate, means for forcing said press plate towards said support, means for moving said knives toward said support, mechanism for gyrating said supporting surface, and means for automatically withdrawing said knives when the presser head is swung about its pivot.

17. A dough dividing machine comprising a frame, a presser head pivoted to said frame, a press plate relatively movable in said presser head in a vertical direction, releasable mechanism carried on the frame of said machine for operating said press plate, and means acting to automatically raise said plate when released.

18. A dough dividing machine comprising a frame, a presser head pivoted to said frame, a press plate relatively movable in said presser head in a vertical direction, releasable mechanism carried on the frame of said machine for operating said press plate, and means acting to automatically raise said plate when released, said means including a spring.

19. A dough dividing machine comprising a frame, a presser head pivoted to said frame, a press plate relatively movable in said presser head in a vertical direction, releasable mechanism carried on the frame of said machine for operating said press plate, means acting to automatically raise said plate when released, and a set of dough dividing knives also movable in said head and means for operating said knives independently of said plate.

20. In a dough dividing and working machine the combination with a working surface, of an oppositely disposed press plate said surface and press plate being relatively movable toward and away from each other, means operable to force said plate and surface together to press the dough between them, means for separating said press plate and surface when said forcing means is inactive and means operable only when said forcing means is inactive for causing relative gyrating movement of said surface and said press plate.

21. In a dough dividing and working machine the combination with a working surface, of an oppositely disposed press plate said surface and press plate being relatively movable toward and away from each other, means operable to force said plate and surface together to press the dough between them dividing knives movable through the dough, means for separating said press plate and surface when said forcing means is inactive and means operable only when said forcing means is inactive for causing relative gyrating movement of said surface and said press plate, said separating means being arranged to separate said pressure plate and surface a predetermined distance.

22. In a dough dividing and working machine the combination with a working surface, of an oppositely disposed press plate said surface and press plate being relatively movable toward and away from each other, means operable to force said plate and surface together to press the dough between them, means for separating said press plate and surface when said forcing means is inactive and means operable only when said forcing means is inactive for causing relative gyrating movement of said surface and said press plate, said separating means including connections between said forcing means and said gyrating means preventing gyration when said forcing means is in action.

23. The method of dividing and working dough which comprises pressing the dough between two surfaces, dividing the pressed dough, then separating said surfaces a predetermined distance and thereafter gyrating one of said surfaces to round the dough whereby free upward expansion of the dough pieces is permitted, until the dough pieces are substantially rounded.

24. In a dough dividing and working machine, the combination with a rotatable dough supporting and working means, of mechanism for rotating said means to work the dough, means for pressing the dough, mechanism for dividing the dough, and resilient means for relatively separating the pressing device and dough supporting and working means after the dough has been divided, whereby to provide space for the dough to freely expand while it is being worked.

25. In a dough dividing and working machine, the combination with a rotatable dough supporting and working means, of mechanism for rotating said means to work the dough, means for pressing the dough, mechanism for dividing the dough, and resilient means for relatively separating the pressing device and dough supporting and working means after the dough has been divided, whereby to provide space for the dough to freely expand while it is being worked, said mechanism for rotating the dough supporting and working means including a hand wheel operatively connected to the latter and adapted to rotate it to a predetermined position.

26. In a dough dividing and working machine, the combination with a gyratory dough supporting plate, of means for gyrating said plate, a pivoted head, a press plate and dough dividing knives mounted on said head and adapted to cooperate with said dough supporting plate to work and divide the dough, and lever actuated grippers for moving said press plate into operative relation with respect to the dough supporting plate.

27. In a dough dividing and working machine, the combination with a gyratory dough supporting plate, of means for gyrating said plate, a pivoted head, a press plate and dough dividing knives mounted on said head and adapted to cooperate with the dough supporting plate to work and divide the dough, lever actuated grippers for moving said press plate into operative relation with respect to the dough supporting plate, and a device for counter-balancing the weight of said head.

In testimony whereof I affix my signature.

GOTTFRIED RAUSCH.